United States Patent [19]

Zobel

[11] Patent Number: 5,046,114
[45] Date of Patent: Sep. 3, 1991

[54] METHOD AND STRUCTURE FOR SEPARATING JOINED PATTERNS FOR USE IN PATTERN AND CHARACTER RECOGNITION SYSTEM

[75] Inventor: David H. Zobel, Redwood City, Calif.

[73] Assignee: The Palantir Corporation, Santa Clara, Calif.

[21] Appl. No.: 782,744

[22] Filed: Oct. 1, 1985

[51] Int. Cl.$^5$ .............................................. G06K 9/34
[52] U.S. Cl. ........................................ 382/9; 382/18
[58] Field of Search ......................... 382/9, 18, 22, 48

[56] References Cited

U.S. PATENT DOCUMENTS

| | | | |
|---|---|---|---|
| 4,365,234 | 12/1982 | Henrichon, Jr. | 382/9 |
| 4,377,803 | 3/1983 | Lotspiech et al. | 382/9 |
| 4,379,282 | 4/1983 | Bailey | 382/9 |
| 4,594,732 | 6/1986 | Tsuji | 382/18 |
| 4,635,290 | 1/1987 | Tsuji et al. | 382/48 |

Primary Examiner—Leo H. Boudreau
Attorney, Agent, or Firm—Steven F. Caserza

[57] ABSTRACT

A method and structure is provided which allows for a plurality of patterns or characters which are joined to be separated for further processing. For characters which are determined not to have a fixed pitch, a first approximation cleavage point is determined based on the width of the segment. Next, a caliper histogram is formed plotting the distance between the uppermost and bottommost "on" pixel in each column of the segment. If a satisfactory minimum in the caliper histogram is found, this segment is cleaved into left and right segments at this point. It not, a raw histogram, indicating the total number of "on" pixels in each column of the segment, is formed. If an adequate minimum of the raw histogram is found, the segment is cleaved into right and left segments at this point. In one embodiment of this invention, the caliper histogram operation is not performed if it is determined that the segment includes top and bottom serifs. Characters determined to be of fixed pitch are separated if a suitable minimum is found in the raw histogram of the segment and, if not, if a satisfactory minimum is found in the caliper histogram for the segment. In one embodiment of this invention, two adjacent segments are compared and, if necessary, joined to form a single segment. This allows separate segments which in fact form a single pattern or character to be combined into a single segment representing that pattern or character for a more accurate analysis.

50 Claims, 6 Drawing Sheets

FIG.5
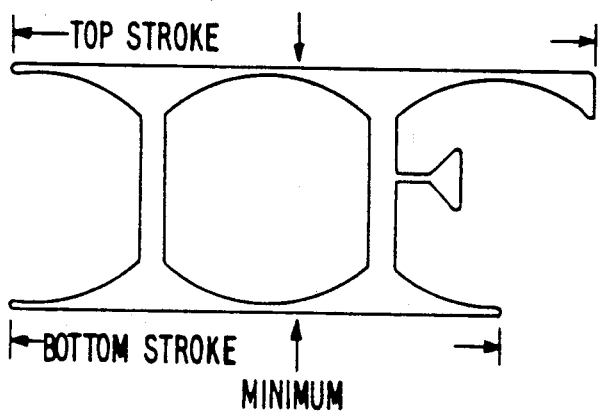
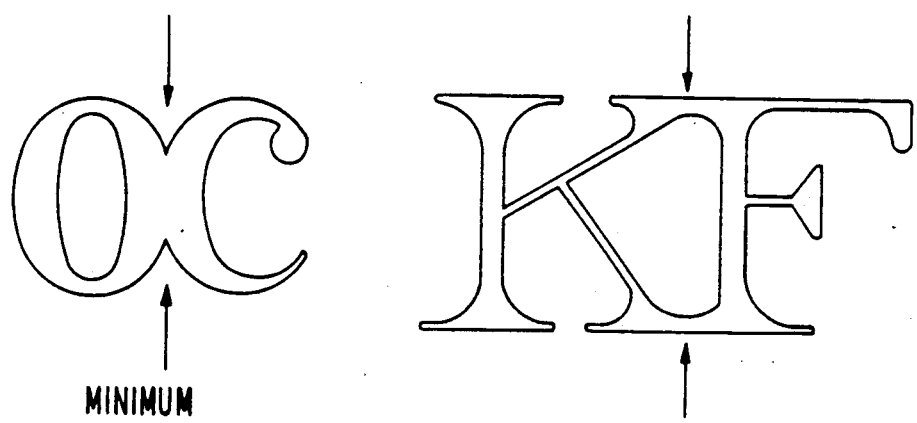
FIG.6
FIG.7

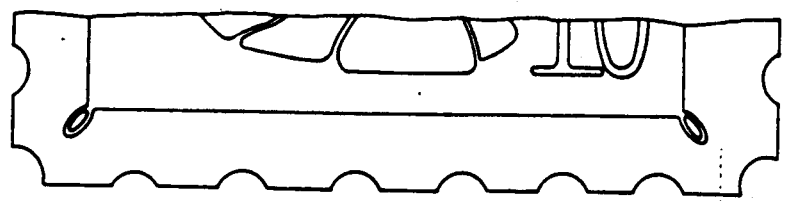
FIG.9

5,046,114

METHOD AND STRUCTURE FOR SEPARATING JOINED PATTERNS FOR USE IN PATTERN AND CHARACTER RECOGNITION SYSTEM

BACKGROUND OF THE INVENTION

A wide variety of pattern recognition systems, including character recognition systems, are known in the art. Each such system receives data, often from an optical device, depicting a pattern to be recognized, and performs certain tasks on this pattern in order to compare it to known patterns in order to "recognize" the input pattern. A flow chart depicting the operation of a typical pattern recognition system is shown in FIG. 1. The input pattern is the pattern which is desired to be recognized. Digitizer 12 converts input pattern 11 to a series of bytes for storage in system memory 13. These bytes are typically binary in nature, reflecting the fact that input pattern 11 is basically a black and white figure. Digitizers are well known in the art and typically are used in such devices as facsimile machines, electronic duplicating machines (as opposed to optical photocopy machines) and optical character recognition systems of the prior art. Memory 13 can comprise any suitable memory device, including random access memories of well-known design. Segmentation 14 serves to divide the image data stored in memory 13 into individual characters. Such segmentation is known in the prior art, and is described, for example, in *Digital Picture Processing*, Second Edition, Volume 2, Azriel Rosenfeld and Avinash C. Kak, Academic Press, 1982, specifically, Chapter 10 entitled "Segmentation".

Feature extraction 15 serves to transform each piece of data (i.e., ideally each character) received from segmentation 14 in order to transform that data into a standard predefined form for use by identification means 16, which in turn identifies each character as corresponding to one of a known set of characters. Output means 17 serves to provide data output (typically ASCII, or the like) to external circuitry (not shown), as desired.

Identification means 16 can be any one of a number of prior art identification means typically used in pattern recognition systems, including, more specifically, optical character recognition systems. One such identification means suitable for use in accordance with the teachings of this invention is described in U.S. Pat. No. 4,259,661, issued Mar. 31, 1981 to Todd, entitled "Apparatus and Method for Recognizing a Pattern". Identification means 16 is also described in *Syntactic Pattern Recognition and Applications*, K. S. Fu, Prentice Hall, Inc., 1982, specifically, Section 1.6, and Appendices A and B.

Inasmuch as this invention pertains to a method for use within segmentation means 14 for use in an optical character recognition system, this patent application, including the description of prior art herein, will focus on segmentation means 14, although it is to be understood that the teachings of this invention are equally applicable for use in pattern recognition systems for recognizing patterns other than characters, or indeed even to systems used to recognize any information capable of being represented mathematically.

Segmentation means 14 serves to separate individual patterns or characters from each other in order that each may be recognized individually. In prior art optical character recognition systems wherein the text being read is known to have a fixed pitch (i.e., the lateral distance between centers of adjacent characters is a constant), if adjacent characters happen to be joined, the joined characters can be separated with some degree of accuracy using rather rigid techniques based upon the constant width of each character. Such prior art systems have the disadvantage that the two or more joined characters often are not separated at the precise point of joining, leaving off a portion of one character and attaching it to the adjacent. This makes recognition of either of those two characters very difficult, if not impossible.

SUMMARY

In accordance With the teachings of this invention, a method and structure is provided which allows for a plurality of patterns or characters which are joined to be separated for further processing. This is in contrast to most prior art optical character recognition systems in which a plurality of joined characters either cannot be detected, or, if fixed pitch text, will be separated using very rigid measurement techniques. For characters which are determined not to have a fixed pitch, a first approximation cleavage point is determined based on the width of the segment. Next, a caliper histogram is formed plotting the distance between the uppermost and bottommost "on" pixel in each column of the segment. If a satisfactory minimum in the caliper histogram is found, this segment is cleaved into left and right segments at this point. If not, a raw histogram, indicating the total number of "on" pixels in each column of the segment, is formed. If an adequate minimum of the raw histogram is found, the segment is cleaved into right and left segments at this point.

Characters determined to be of fixed pitch are separated if a suitable minimum is found in a raw histogram of the segment and, if not, if a satisfactory minimum is found in the caliper histogram for the segment.

In one embodiment of this invention, a technique is employed whereby two adjacent segments can be compared and, if necessary, joined to form a single segment. This allows separate segments which in fact form a single pattern or character to be combined into a single segment representing that pattern or character for a more accurate analysis.

BRIEF DESCRIPTION OF THE DRAWING

FIGS. 5-9 show various joined characters which are separated in accordance with the teachings of this invention;

FIG. 11 as a flow chart for finding serifs in accordance with one embodiment of this invention.

DETAILED DESCRIPTION

For the purposes of this specification, a "segment" is a digitized representation of any part of the image input to the digitizer (FIG. 1) in a pattern recognition system. In one embodiment, a segment is a rectilinear array of pixels ("picture elements"), with each pixel being a single dot, often square in shape, representing the smallest piece of video data obtained from a digitizer. In binary digitization systems, each pixel may only exist in one of two states: on or off. One of these states may be indicated by the pixel having a value of logical 1; the other by the value logical 0. It is immaterial which state is identified with a particular value, so long as the chosen association is consistent throughout the entire system. For purposes of this specification, "on" pixels are associated with the black regions of the input pattern and have the value of logical 1; the "off" pixels are associated with the white regions in the input pattern and have the value of logical 0.

The "width" of a segment is the size, in pixels, of the image representation contained in a segment, as measured along the horizontal dimension, and not including any unused S right and left pixels.

In contrast, the "overall width" of a segment is the sum of the width of the unused left portion of a segment, the width of the unused right portion of the segment, and the width of the segment.

SEGMENT ORGANIZATION

Figure 3:
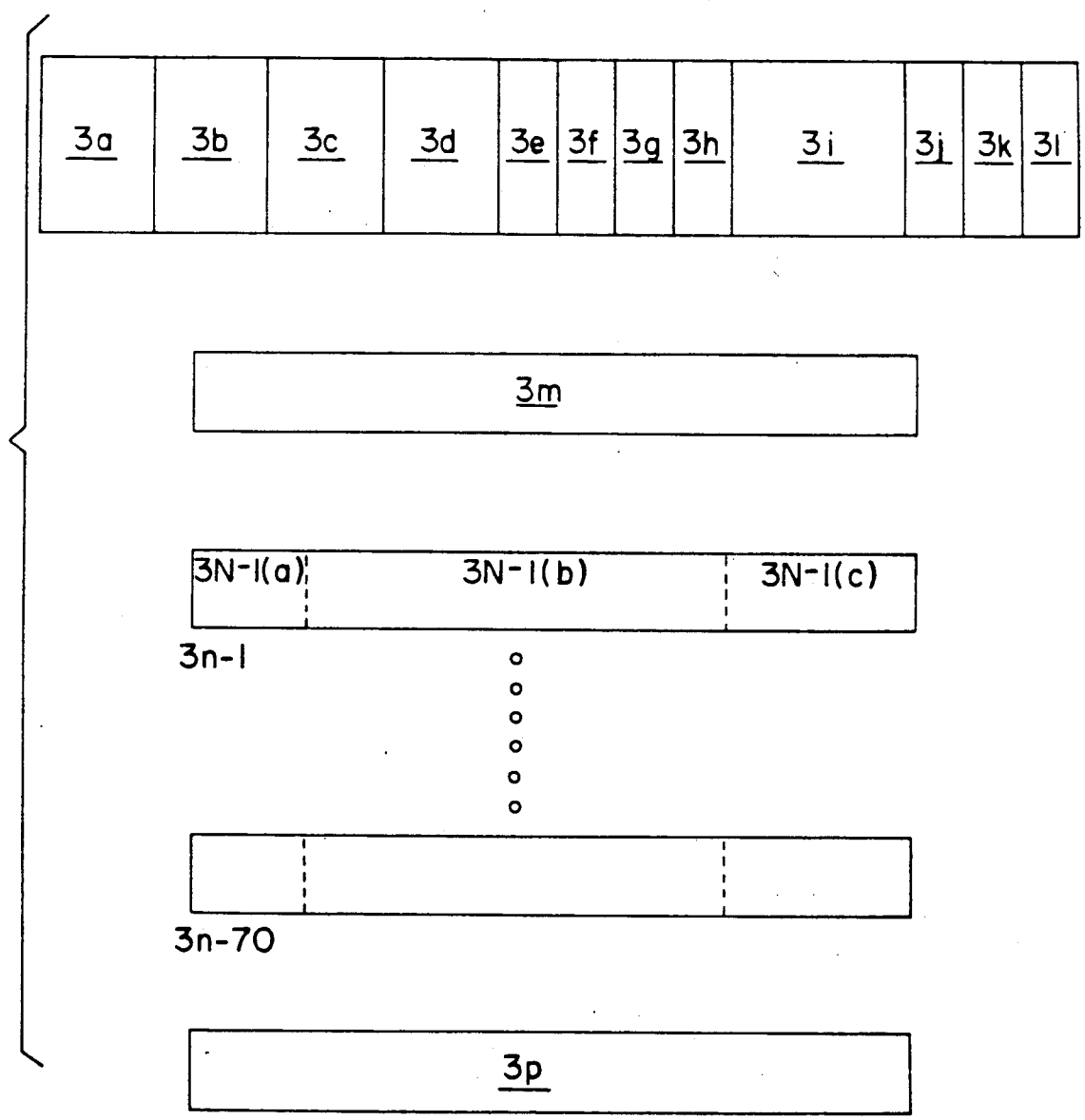
FIG. 3 depicts the data structure used in accordance with one embodiment of this invention.
Figure 4B:
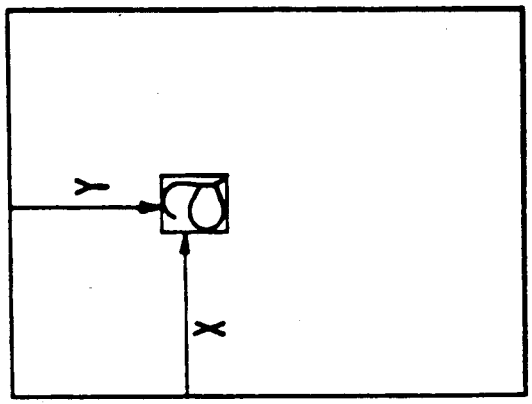
FIG. 4b depicts the x and y position of a character on a page being read by an optical character recognition system.
Figure 4A:
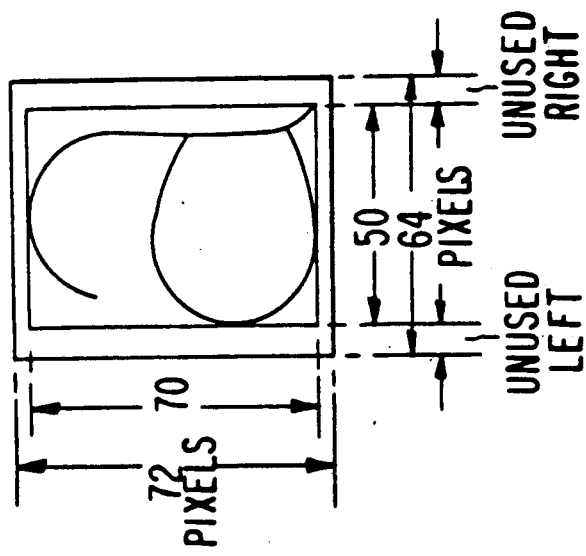
FIG. 4a depicts the character "a" as read by one embodiment of an optical character recognition system constructed in accordance with the teachings of this invention.
Figure 8:
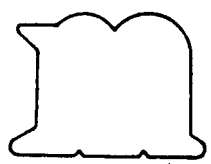

FIG. 3 and Table 1 depict the organization of a typical data structure representing a segment used in one embodiment of this invention. The segment shown in FIG. 3 contains an integral number of 32 bit words. Field 3a contains 16 bits and defines the X position of this segment, relative to the upper left-hand corner of the page being read. Similarly, field 3b contains 16 bits defining the Y position of this segment relative to the upper left-hand corner of the page being read. The X and Y positions of a segment on a page are illustrated in FIG. 4b. Field 3c is a 16 bit field defining the width of the character (in the case of character "a" of FIG. 4a, 50 pixels). Field 3d of the segment is a 16 bit field defining the height (in the case of FIG. 4a, 70 pixels) of the segment. Field 3e is an eight bit field defining the amount of unused pixels to the left of the segment, and field 3f is an eight bit field defining the number of unused pixels to the right of the segment (FIG. 4a). As is seen from FIG. 4a, the sum of the unused left and the unused right area is 64 minus 50 pixels. Of importance, the width of each row within FIG. 4a is an integral number of 32 bit words sufficient to contain the pixels in each horizontal row of the segment in question, together with at least one bit of unused left and one bit of unused right area. The reason for providing at least one bit of unused left and one bit of unused right area is to allow, if desired, the use of additional processing which serves to separate two or more characters in a single segment based upon the fact that each such character is completely surrounded by an area of white. Thus, in the example shown in FIG. 4a, where the width of the segment is 50 pixels, and including one unused left pixel and one unused right pixel, yielding 52, the width of the row length is rounded up to 64.

Field 3g is an eight bit field defining the number of rows which are unused above the segment, and field 3h is an eight bit field defining the number of rows which are unused beneath the segment. For the example shown in FIG. 4a, the character "a" is 70 pixels high, and a single unused top row and an unused bottom row are required, thus making the number of rows equal to 72. The single unused top row and unused bottom row are used, if desired, to allow for the separation of a plurality of characters in a single segment based on the fact that each character is completely surrounded by white area. Field 3i is 24 bits wide and stores a serial number associated with this particular segment for use in identifying this segment. Field 3j is an eight bit field defining the average pitch of a number of characters preceding the character in question. Field 3k is an eight bit field defining the average width of a number of characters preceding the character in question. Field 3l contains a plurality (in one embodiment 16) of bits each representing a flag, such as a flag indicating if the segment has fixed pitch. Field 3m is, in this example shown in FIG. 4a, a 64 bit field containing the unused top row. Field 3p is, again in the embodiment described in conjunction with FIG. 4a, a 64 bit field corresponding to the unused bottom row. In between fields 3m and 3p are a plurality of fields such as field 3n-1, each including three subfields: the unused left pixels subfield 3n-1(a), the pixel data 3n-1(b) and the unused right pixel field 3n-1(c). In the embodiment shown in FIG. 4a, since there are 70 rows of pixels defining the character "a" (i.e., the character "a" is 70 pixels high), there are 70 such fields 3n-1 through 3n-70, including pixel data field 3n-1(b) through pixel data field 3n-70(b).

TABLE 1

| Segment | Name | Number of bits |
| --- | --- | --- |
| 3a | X position | 16 |
| 3b | Y position | 16 |
| 3c | width | 16 |
| 3d | height | 16 |
| 3e | unused left | 8 |
| 3f | unused right | 8 |
| 3g | unused top | 8 |
| 3h | unused bottom | 8 |
| 3i | serial number | 24 |
| 3j | average pitch | 8 |
| 3k | average width | 8 |
| 3l | flags | 16 |
| 3m | unused top row | 64 |
| 3n-1(a) | unused left pixels | varies with input data |
| 3n-1(b) | used pixels | varies with input data |
| 3n-1(c) | unused right pixels | varies with input data |
| 3p | unused bottom row | 64 |

SEPARATION OF JOINED CHARACTERS HAVING VARIABLE PITCH

Identification of Joined Serifs

Figure 2:
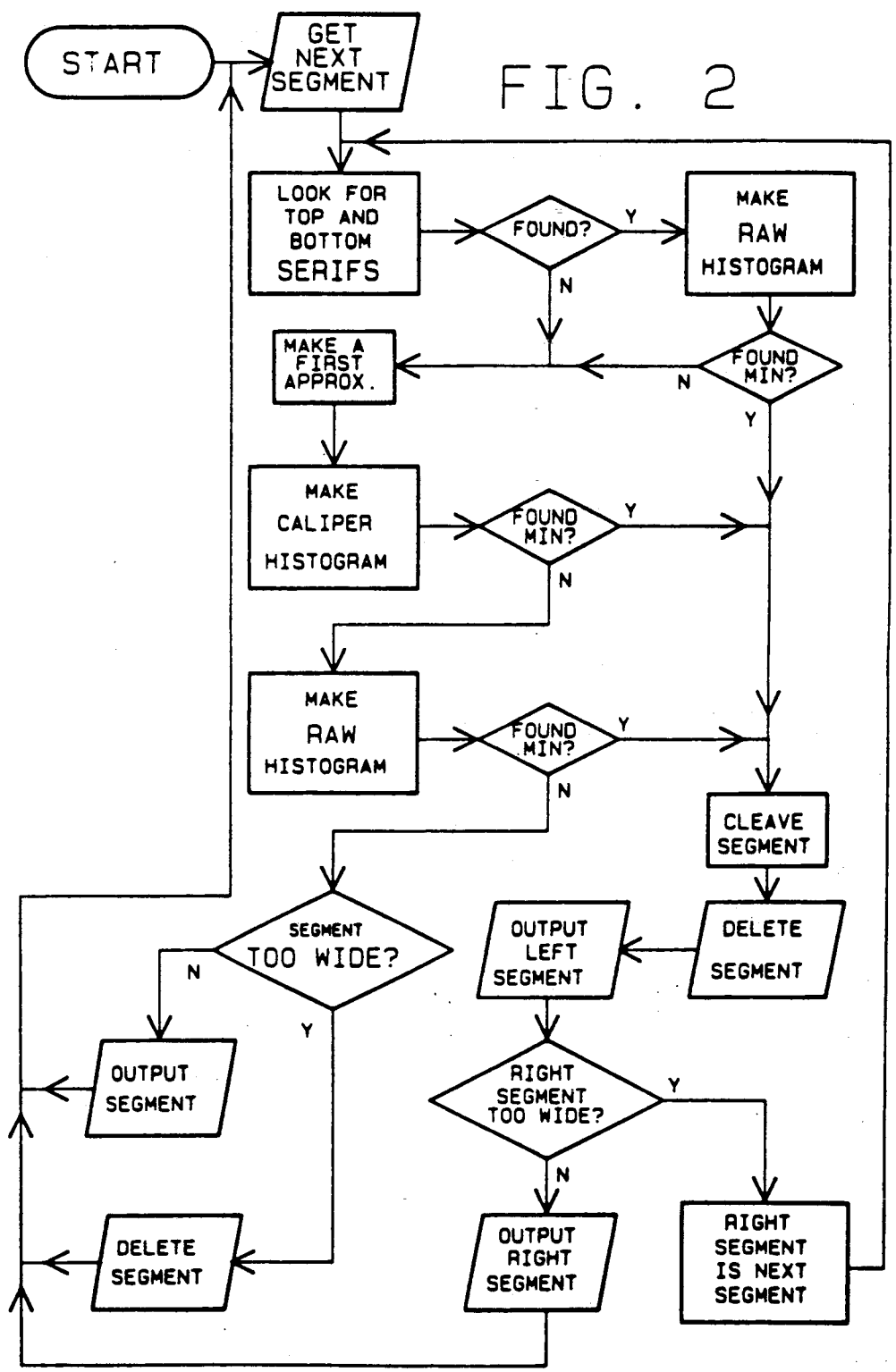
FIG. 2 is a flow chart depicting one embodiment of a method and structure for separating joined patterns in accordance with the teachings of this invention.

FIG. 2 is a flowchart depicting one embodiment of a method used for separating horizontally joined characters in accordance with the teachings of this invention. First, the next data segment to be separated is obtained.

Upon receipt of the segment, in one embodiment of this invention, when Latin characters are being read, the next step is to look for top and bottom joined serifs, which must be treated in a unique manner since the remainder of this method relies in part upon the calculation of pixel histograms. FIG. 5 depicts such a set of characters having joined serifs. In one embodiment, as depicted in FIG. 11, in order to determine if the segment contains top and bottom joined serifs, it is determined if the segment contains a string of columns having width greater than or equal to $\frac{3}{8}$ W (where W is the width of the characters contained in the segment as defined in field 3c), each such column having an "on" pixel in any one of the (5/32)H uppermost rows and in any one of the bottommost (5/32)H rows, where H is the height (Field 3d) of the characters contained in the segment.

If this is the case, it is presumed that joined serifs have been found and a raw histogram is formed of the number of "on" pixels in the vertical direction for the width of the segment. Alternatively, such a raw histogram is formed only for those columns in which there are both top and bottom serifs. It is then determined if the raw histogram contains a satisfactory minimum. In one embodiment of this invention, the minimum of the raw histogram must be less than half the height of the B characters contained in the segment in order to be considered as a satisfactory raw minimum. If a satisfactory raw minimum is found, the segment is cleaved into two separate signals at the cleavage point corresponding to the satisfactory minimum. A more detailed description of this cleaving operation occurs later, although, briefly the single segment which is being cleaved is used to formulate two new segments, and the original segment is deleted. However, if it is determined that top and bottom joined serifs are not contained within the segment, or a satisfactory raw minimum is not found, operation is advanced to the first approximation step in order to properly divide the segment into individual characters.

First Approximation

If a cleave operation is not to be performed on a segment determined to have joined serifs, or, if joined serifs are not present, a first approximation at where the segment should be cleaved is made. This first approximation is accomplished by simply locating the horizontal center of the segment. In other embodiments of this invention, alternative techniques for locating a first approximation cleavage point are used, such as locating a point from the left edge of the segment along the horizontal axis of the segment equal to the average width of recently received characters. The average pitch of recently received characters can be used rather than the average width of recently received characters, as described in the previous alternative embodiment. Alternatively, other techniques for making this first approximation can be used if desired. Of importance, the width of the character, the average pitch, and the average width, are all readily available in the segment, as previously described in relation to FIG. 3 and Table 1.

Caliper Histogram

Next, a caliper histogram of the pixel data contained in the segment is formed. A caliper histogram, as used in this specification, is defined as a histogram plotting the distance between the uppermost and the bottommost "on" pixel in each column of the segment. Thus, in the example of FIG. 4a, the segment contains a plurality of 50 columns, and thus a histogram of 50 points is formed. This is accomplished quite easily, for example, by accessing each row of pixel data contained in the segment and determining the topmost row containing such an "on" pixel, and the bottommost row containing such an "on" pixel, subtracting their row values, and adding one. This in turn is done for each column of pixel data in the segment. In one embodiment of this invention, in order to enhance the speed of this process, and more importantly to avoid considering nonmeaningful data (as far as cleaving a segment is concerned) near the edges of the segment, such a caliper histogram is generated only for those columns near the "first approximation" cleavage point. In one embodiment of this invention, such a caliper histogram is generated for those columns within a distance of one quarter the width of the segment on either side of the first approximation cleavage point.

If a satisfactory minimum of the caliper histogram is located, the segment is sent to the "cleave segment" step, where it is cleaved at the caliper histogram minimum into two separate segments.

In one embodiment of this invention, the minimum of the caliper histogram must be no greater than (13/16)H in order to be considered a satisfactory caliper histogram minimum.

Raw Histogram

On the other hand, if a satisfactory caliper histogram is not found, a raw histogram is formed, plotting the total number of "on" pixels in each vertical column. In one embodiment of this invention, in order to enhance the speed of this process and more importantly to avoid considering nonmeaningful (as far as cleaving a segment is concerned) data near the edges of the segment, such a raw histogram is generated only for those columns near the "first approximation" cleavage point. In one embodiment of this invention, such raw histogram is generated for those columns within a distance of one quarter of the width of the segment on either side of the first approximation cleavage point.

If the raw histogram contains a satisfactory minimum, the segment is cleaved at that point. In one embodiment of this invention, the minimum of the raw histogram must be less than 1/10 of the segment height in order to be considered a satisfactory minimum.

In accordance with one embodiment of this invention, when any raw histogram minimum or caliper histogram minimum is located within a certain distance from the edge of the segment, such minimum is not used in order to prevent the cleavage operation from providing a segment having too few pixels in width. In one embodiment of this invention, such minimums located within three pixels of the edge of the segment are not considered. In another embodiment of this invention, such minimums located within H/4 pixels of the edge of the segment are not considered, where H is the height in pixels, of the segment. Similarly, if a minimum is located such that it causes the left segment to be wider than the width of a segment which feature extraction (FIG. 1) can process, such minimum is not used to cleave the segment If the minimum is located such that it causes the right segment created by the cleavage operation to be wider than can be processed by feature extraction, the right segment becomes the new current segment and is recirculated (i.e. is subjected to the entire process for separating joined characters contained in a single segment).

In the event that a satisfactory raw minimum is not located, which will provide a left segment which is not too wide to be properly dealt with by the feature extraction technique being used, the segment is flagged as an unrecognizable element, or deleted. Conversely, if a satisfactory minimum is not located and the segment is not too wide to be processed by the feature extraction technique being used, the segment is passed on unchanged to the feature extraction step, in order to determine if the segment in fact contains a single recognizable character.

Cleave Operation

As previously discussed, there are several possible ways to initiate the cleave operation. The purpose of the cleave operation is to create two new segments from the original segment being analyzed, and to delete the original segment. For purposes of discussion, the two new segments which are created will hereinafter be referred to as the left segment and the right segment. The only information, other than the original segment, which is passed to the cleave operation, is the width of the left segment (i.e., where the original segment is to be cleaved).

Thus, the left segment is created having the same X position value as the original segment. The Y position data is recalculated in order to accurately reflect the position on the page of the topmost row of the left segment containing "on" pixels. This is necessary because the left segment may now have a different height than the right segment, and thus a different Y position. The width of the left segment is known, since this is defined by the cleave point. The height of the left segment is recalculated as previously discussed in conjunction with calculating the Y position of the left segment. The unused left width remains the same. The unused right width is calculated such that the overall width of the left segment is an integral number of 32 bits, and such that the unused right width has a minimum value of one. The unused top height and unused bottom height remain the same and are equal to one, as previously described. The serial number of the left segment remains the same, with a suffix indicating that additional segments have been created from the original segment. The average pitch and average width information remain the same. In one embodiment, a flag is set indicating that the left segment has been cleaved from an original segment. The unused top information and the unused bottom information remain the same, although their length may decrease if, as a result of the cleave operation, the overall width of the left segment has been decreased from the overall width of the original segment. The remaining data, containing the unused left, unused right, and pixel data, is constructed such that the unused left information is the same as in the original segment, the pixel data contains the pixels of the left segment, and the unused right data subfield contains a sufficient number of bits such that the overall width of the left segment is equal to an integral number of 32 bits. Of importance, if the height of the left segment is decreased from the height of the original segment, the total number of pixel data fields will decrease.

In similar fashion, the right segment is formed. However, when forming the right segment, the X position data is changed to equal the X position data of the original segment plus the width of the left segment. The Y position and height of the right segment are recalculated in the same manner and for the same reasons as previously described with regard to the left segment. The width of the right segment is equal to the width of the original segment minus the width of the left segment. The unused right width is the same as the unused right width for the original segment. The unused top height and unused bottom height are the same as for the original segment and are equal to one as previously described. The unused left width is recalculated in such a manner that the overall width of the right segment is equal to an integral number of 32 bits, and the unused left width of the right segment must be at least one. The serial number of the right segment is equal to the serial number of the original segment plus a suffix indicating that another segment has been cleaved from this segment. In one embodiment, a flag is set indicating that the right segment has been cleaved from the original segment. The average pitch and average width remain the same, the unused top and unused bottom data remain the same, subject to a narrowing in their width should the overall width of the right segment be less than the overall width of the original segment. The unused left data subfield contains a sufficient number of bits such that the overall width of the right segment is equal to an integral number of 32 bits. The unused right data remains the same, and the pixel data is the same as the pixel data for the right portion of the original segment.

Each of these left and right segments is then sent to feature extraction (FIG. 1) in sequence for further processing, as previously described.

In accordance with the teachings of this invention, the algorithm is, in one embodiment, implemented using a microprocessor, such as the Motorola MC68000, and suitable memory devices for storing, instructions, and memory of a well known design suitable for storing the segment to be processed, intermediate results, and the left and right segments generated by this processing.

EXAMPLES

Examples of a number of segments, together with the result of the operation of this method, are shown in conjunction with Tables 2 through 6 and FIGS. 5 through 9, respectively.

TABLE 2

(FIG. 5)

1. Start
2. Get next segment
3. Find top and bottom serifs? : Yes
4. Make raw histogram
5. Find satisfactory minimum? : Yes
6. Cleave Segment
7. Delete original segment
8. Output left segment
9. Is right segment too wide? : No
10. Output right segment
11. Get next segment (item #2)

TABLE 3

(FIG. 6)

1. Start
2. Get next segment
3. Find top and bottom serifs? : No
4. Make first approximation
5. Make caliper histogram
6. Find satisfactory minimum? : Yes
7. Cleave segment
8. Delete original segment
9. Output left segment
10. Is right segment too wide? : No
11. Output right segment
12. Get next segment (item #2)

TABLE 4

(FIG. 7)

1. Start
2. Get next segment
3. Find top and bottom serifs? : No
4. Make first approximation

TABLE 4-continued
(FIG. 7)

5. Make caliper histogram
6. Find satisfactory minimum? : No
7. Make raw histogram
8. Find satisfactory minimum? : Yes
9. Cleave segment
10. Delete original segment
11. Output left segment
12. Is right segment too wide? : No
13. Output right segment
14. Get next segment (item #2)

TABLE 5
(FIG. 8)

1. Start
2. Get next segment
3. Find top and bottom serifs? : Yes
4. Make raw histogram
5. Find satisfactory minimum? : No
6. Make first approximation
7. Make caliper histogram
8. Find satisfactory minimum? : No
9. Make raw histogram
10. Find satisfactory minimum? : No
11. Is segment too wide? : No
12. Pass segment, unchanged
13. Get next segment (item #2)

TABLE 6
(FIG. 9)

1. Start
2. Get next segment
3. Find top and bottom serifs? : No
4. Make first approximation
5. Make caliper histogram
6. Find satisfactory minimum? : No
7. Make raw histogram
8. Find satisfactory minimum? : No
9. Is segment too wide? : Yes
10. Delete segment
11. Get next segment (item #2)

SEPARATION OF JOINED CHARACTERS HAVING FIXED PITCH

Figure 10:
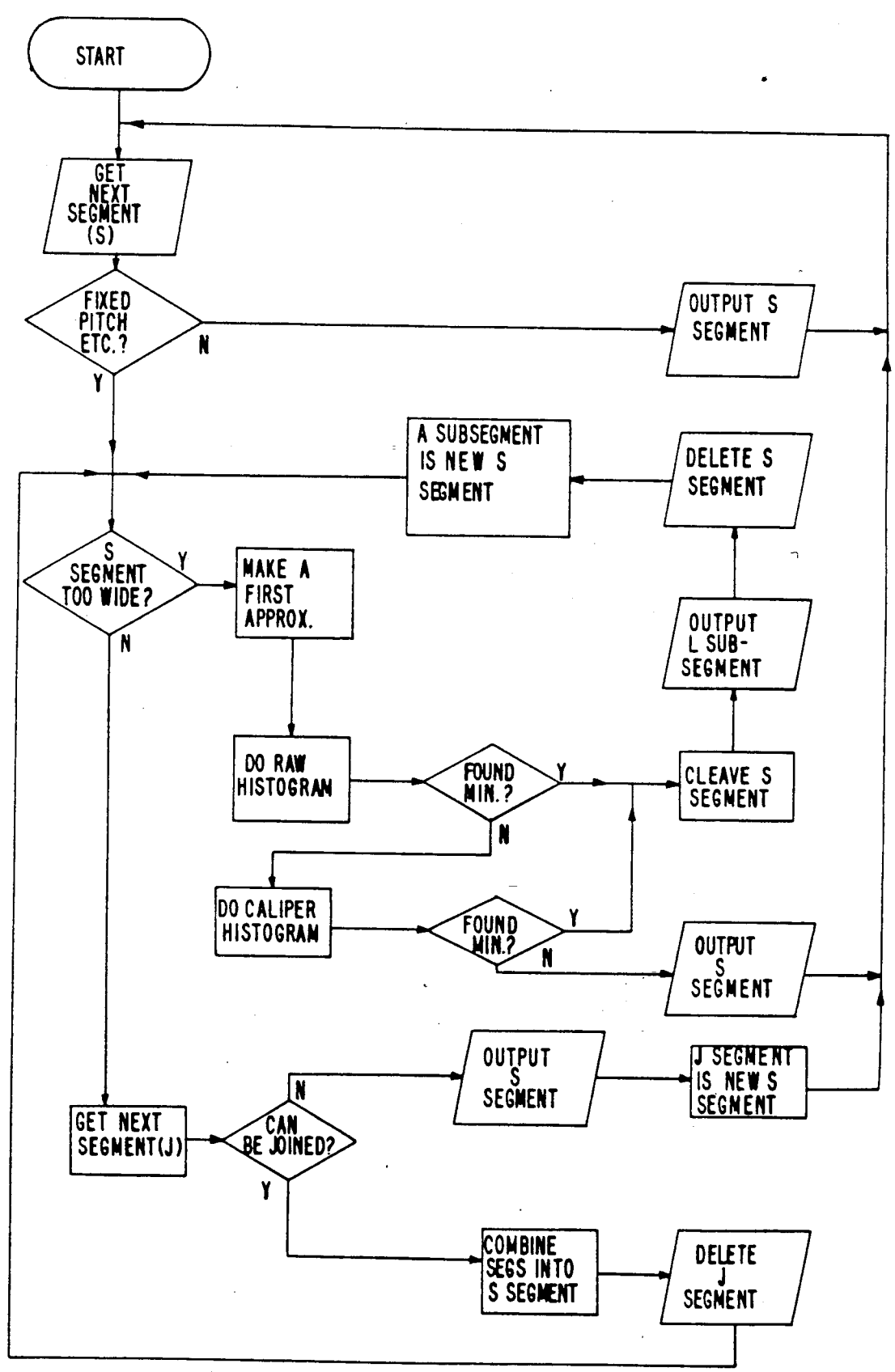
FIG. 10 is a flow chart of another embodiment of this invention.

In accordance with one embodiment of this invention, joined characters having fixed pitch are separated. One technique in accordance with the teachings of this invention for separating joined characters having fixed pitch is shown in FIG. 10. In this embodiment, two segments which are adjacent in the data file are processed simultaneously, thereby allowing these two segments to be joined if it is determined that their features indicate that they should be joined (i.e. a single character was divided, having a portion in each of the two segments). Naturally, as will be appreciated by those skilled in the art in light of the teachings of this invention, this technique can be used without the ability to join adjacent segments, if so desired. For the purposes of this specification, and as shown in FIG. 10, the first of the two segments being processed is called the "S" segment, and the second segment being processed is called the "J" segment.

First, the next S segment to be processed is fetched. It is determined if the S segment which has been fetched has fixed pitch and has certain statistical qualities. Whether the S segment has fixed pitch is easily determined by a bit contained in the flags field 31 (FIG. 3), which was set based upon the average pitch of a plurality of characters preceding the character in question. If the S segment does not have its average pitch (field 3j) and average width (field 3k) defined, for example, when the S segment is at the beginning of a contextual region (i.e. a separate column or line) on a page, the S segment does not have the necessary data to allow for cleavage based upon fixed character pitch In this event, the S segment is output to additional processing means (not shown).

Conversely, if the S segment has fixed pitch and contains average pitch and average width information, it is determined if the S segment is too wide to be presumed to be a single character, thus requiring the segment to be separated into two or more distinct characters. If the S segment is not too wide to be a single character, the next J segment is fetched. As previously described, this J segment is simply the segment in the data stream subsequent to the S segment.

Figure 1:
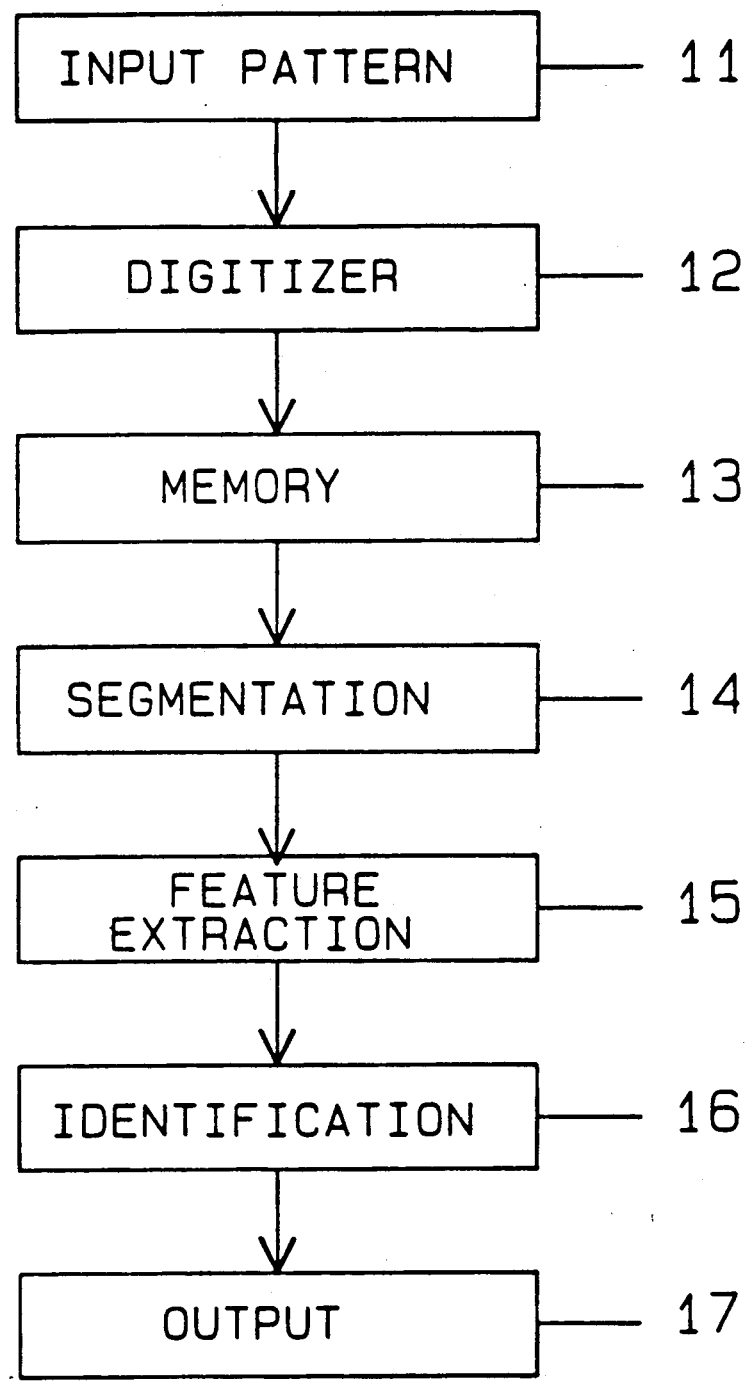
FIG. 1 is a description of a prior art pattern recognition system.

Next, it is determined if the J segment is fixed pitch (flag field 31) and can be joined with the S segment to form a single new S segment To determine whether the J segment can be joined with the S segment, it is determined whether they do not reside in separate contextual regions of the document being read (i.e. separate columns or lines), if the horizontal distance between the centers of the S segment and the J segment is less than a certain proportion (in one embodiment 0.75) of the average pitch of the S segment, and if the distance between the horizontal and vertical extremes of the S and J segments are not greater than the maximum dimensions allowable for a single segment, for example the maximum dimensions allowable for segments to be processed in feature extraction means 15 (FIG. 1). If so, the S and J segments are joined to form a new S segment, the J segment is deleted, and the new S segment is processed again.

Segments S and J are combined by making the X position of the new S segment equal to the lesser of the X position of the S segment and the J segment, the Y position of the new S segment equal to the lesser of the Y position of the S segment and the J segment, the width of the new S segment equal to the greatest value of the right edge of the S segment and the J segment minus the lesser value of the left edge of the S segment and the J segment. The height of the new S segment is calculated as the greater of the bottom edges of the S and J segments minus the lesser of the top edges of the S and J segments. The unused left width, unused right width, unused top height and unused bottom height are calculated in the same manner as previously described with regard to the cleavage operation. The serial number of the new S segment is equal to any convenient serial number, which may or may not be required in later processing sequences. The average pitch and the average width retain the same values as in the S segment. The unused top pixel data, (field 3m of FIG. 3) is a single unused line of white pixels, and the unused bottom pixel data, field 3p is a single line of unused white pixels. The pixel data fields 3n are simply the combination of the S segment and J segment pixel data which may result in a new combined S segment wider than either original S or J segment.

Conversely, if it is determined that the S segment is too wide to be a single unjoined character, additional processing is performed to separate the S segment into two distinct segments. In this event, a first approximation of a cleavage point is calculated, for example by selecting the column from the left edge of the S segment whose value is equal to the average pitch of the S segment. Next, a raw histogram of the S segment is formed; in one embodiment rather than forming the raw histogram for each column of the segment, the raw histogram is formed for only those columns near the first approximation cleavage point (e.g. one fourth the width of the segment on either side of the first approximation cleavage point). If a satisfactory raw histogram minimum is found, the S segment is cleaved. In one embodiment of this invention, the minimum of the raw histogram must be not greater than one eighth of the height of the S segment in order to be considered a satisfactory minimum.

If a satisfactory minimum raw histogram is not found, a caliper histogram of the S segment is formed. If a satisfactory caliper histogram minimum is found, the S segment is cleaved. In one embodiment of this invention, a satisfactory minimum of the caliper histogram is less than 15/16 of the height of the S segment. If a satisfactory caliper histogram minimum is not found, it has been determined that the S segment should be not be cleaved into two separate segments, and the entire S segment is output for use by other processing means (not shown).

On the other hand, if a satisfactory minimum of the raw histogram or the caliper histogram is found, the S segment is cleaved in a manner previously described regarding the cleave operation. The left segment provided by the cleave operation is then output to other processing means (not shown), the S segment which has now been cleaved into left and right segments is deleted, and the right segment provided by the cleave operation becomes the new S segment. Processing of the new S segment continues with the step of determining if the new S segment is too wide to be considered as a single character.

In one embodiment, in the event that any raw histogram minimum or caliper histogram minimum is in fact a minimum which extends in the horizontal direction over a number of columns, the cleavage point associated with that minimum (the last column to be contained in the left segment created by the cleave operation) is taken to be the rightmost minimum.

Also, in one embodiment, in the event that more than one satisfactory minimum is located for a segment, not containing joined serifs, the satisfactory minimum closest to the first approximation point is chosen as the cleavage point.

In one embodiment, in the event that more than one satisfactory minimum is located for a segment containing joined serifs or in the event that the chosen satisfactory minimum for segments not having joined serifs will provide a left segment that is too large, the cleavage point is chosen as that satisfactory minimum that will cause the cleaved left segment to be as large as possible, but not too large to be processed by other processing modules such as feature extraction 15 (FIG. 1).

While this specification illustrates specific embodiments of this invention, it is not to be interpreted as limiting the scope of the invention. Many embodiments of this invention will become evident to those of ordinary skill in the art in light of the teachings of this specification. For example, in any of the examples given in this specification, the position of the steps of making the raw and caliper histograms can be reversed.

I claim:

1. A method for separating a data segment representing an array of pixels having a plurality of rows and columns into a plurality of segments comprising the steps of:

fetching a data segment;

creating a first histogram selected from the group of histograms consisting of a caliper histogram indicating the distance between the topmost and bottommost "on" pixels for a plurality of columns of said array of pixels and a raw histogram indicating the number of "on" pixels in a plurality of columns of said array of pixels;

determining if a satisfactory minimum of said first histogram exists;

if a satisfactory minimum of said first histogram does not exist, creating a second histogram of a type other than said first histogram, said second histogram selected from said group of histograms consisting of a caliper histogram and a raw histogram, and determining if a satisfactory minimum of said second histogram exists; and cleaving said data segment about said satisfactory minimum of said first histogram or said satisfactory minimum of said second histogram, thereby forming a left segment and a right segment.

2. The method as in claim 1 wherein said caliper histogram is created for all said columns of said array of pixels.

3. The method as in claim 1 wherein said caliper histogram is created which does not include data associated with columns located near the edge of said array of pixels.

4. The method as in claim 1 wherein said caliper histogram is created which includes data associated with columns located within a selected number of columns from a first approximation cleavage point.

5. The method as in claim 4 wherein said first approximation cleavage point is the horizontal center of said array of pixels.

6. The method as in claim 4 wherein said first approximation cleavage point is located a selected distance from a selected horizontal edge of said array of pixels equal to the average width of one or more of said single patterns.

7. The method as in claim 4 wherein said single patterns are characters and said first approximation point is located a selected distance from a selected horizontal edge of said array of pixels equal to value selected from the set of values consisting of average character pitch and average character width.

8. The method as in claim 6 wherein said selected number of columns is equal to one fourth the number of columns in said array of pixels.

9. The method as in claim 7 wherein said selected number of columns is equal to one fourth the number of columns in said array of pixels.

10. The method as in claim 1 wherein said satisfactory minimum of said caliper histogram must be no greater than a selected fraction of the height of said array of pixels.

11. The method as in claim 10 wherein said selected fraction is selected from the group of fractions consisting of 13/16 and 15/16.

12. The method as in claim 1 wherein said satisfactory minimum of said caliper histogram must be no greater than a selected fraction of the greatest vertical distance between the topmost and bottommost "on" pixel in said array of pixels.

13. The method as in claim 12 wherein said selected fraction is selected from the group of fractions consisting of 13/16, ⅞, and 15/16.

14. The method as in claim 1 wherein said raw histogram is created for all said columns of said array of pixels.

15. The method as in claim 1, wherein said raw histogram is created which does not include data associated with columns located near the edge of said array of pixels.

16. The method as in claim 1 wherein said raw histogram is created which includes data associated with columns located within a selected number of columns from a first approximation cleavage point.

17. The method as in claim 16 wherein said first approximation point is the horizontal center of said array of pixels.

18. The method as in claim 16 wherein said first approximation point is located a selected distance from a selected horizontal edge of said array of pixels equal to the average width of one or more of said single patterns.

19. The method as in claim 16 wherein said single patterns are characters and said first approximation point is located a selected distance from a selected horizontal edge of said array of pixels equal to a value selected from the set of values consisting of average character pitch and average character width.

20. The method as in claim 18 wherein said selected number of columns is equal to one fourth the number of columns in said array of pixels.

21. The method as in claim 19 wherein said selected number of columns is equal to one fourth the number of columns in said array of pixels.

22. The method as in claim 1 wherein said satisfactory minimum of said raw histogram must be no greater than a selected fraction of the height of said array of pixels.

23. The method as in claim 22 wherein said selected fraction is selected from the group of fractions consisting of ⅛ and 1/10.

24. The method as in claim 1 wherein said satisfactory minimum of said raw histogram must be no greater than a selected fraction of the vertical distance between the topmost and bottommost "on" pixels in said array of pixels.

25. The method as in claim 24 wherein said selected fraction is selected from the group of fractions consisting of ⅛ and 1/10.

26. The method as in claim 1 wherein said single patterns are characters and said caliper histogram is not created if said segment contains serifs.

27. The method as in claim 26 wherein said caliper histogram is not created if said array of pixels contains a string of columns of a selected width having an "on" pixel in one or more of a selected number of uppermost rows of said array of pixels and a string of columns of said selected width having an "on pixel" in one or more of said selected number of bottommost rows of said array of pixels.

28. The method as in claim 27 wherein said selected width is equal to a selected fraction of the number of columns in said array of pixels.

29. The method as in claim 28 wherein said selected fraction is ⅛.

30. The method as in claim 27 wherein said selected width is equal to a selected fraction of the greatest horizontal distance between the leftmost and the rightmost "on" pixel in the rows of said array of pixels.

31. The method as in claim 30 wherein said selected fraction is ⅛.

32. The method as in claim 27 wherein said selected number of uppermost rows and bottommost rows is equal to a selected fraction of the number of rows of said array of pixels.

33. The method as in claim 32 wherein said selected fraction is 5/32.

34. The method as in claim 27 wherein said selected number of uppermost rows and bottommost rows is equal to a selected fraction of the greatest distance between the uppermost and bottommost "on" pixels of said array of pixels.

35. The method as in claim 34 wherein said selected fraction is 5/32.

36. The method as in claim 1 wherein said data segment is formed by combining two segments prior to creating said first histogram.

37. A method for separating a data segment representing an array of pixels having a plurality of rows and columns into a plurality of segments comprising the steps of:
fetching a data segment;
creating a caliper histogram indicating the distance between the topmost and bottommost "on" pixels for a plurality of columns of said array of pixels;
determining if a satisfactory minimum of said caliper histogram exists; and
cleaving said data segment about said satisfactory minimum of said caliper histogram, thereby forming a left segment and a right segment.

38. The method as in claim 37 wherein said caliper histogram is created for all said columns of said array of pixels.

39. The method as in claim 37 wherein said caliper histogram is created which does not include data associated with columns located near the edge of said array of pixels.

40. The method as in claim 37 wherein said caliper histogram is created which includes data associated with columns located within a selected number of columns from a first approximation cleavage point.

41. The method as in claim 40 wherein said first approximation cleavage point is the horizontal center of said array of pixels.

42. The method as in claim 40 wherein said first approximation cleavage point is located a selected distance from a selected horizontal edge of said array of pixels equal to the average width of one or more of said single patterns.

43. The method as in claim 40 wherein said single patterns are characters and said first approximation point is located a selected distance from a selected horizontal edge of said array of pixels equal to value selected from the set of values consisting of average character pitch and average character width.

44. The method as in claim 42 wherein said selected number of columns is equal to one fourth the number of columns in said array of pixels.

45. The method as in claim 43 wherein said selected number of columns is equal to one fourth the number of columns in said array of pixels.

46. The method as in claim 37 wherein said satisfactory minimum of said caliper histogram must be no greater than a selected fraction of the height of said array of pixels.

47. The method as in claim 46 wherein said selected fraction is selected from the group of fractions consisting of 13/16 and 15/16.

48. The method as in claim 37 wherein said satisfactory minimum of said caliper histogram must be no greater than a selected fraction of the greatest vertical distance between the topmost and bottommost "on" pixel in said array of pixels.

49. The method as in claim 48 wherein said selected fraction is selected from the group of fractions consisting of 13/16, $\frac{1}{8}$, and 15/16.

50. The method as in claim 37 wherein said data segment is formed by combining two segments prior to creating said histogram.

* * * * *